United States Patent

Ishitsuka (10) Patent No.: US 10,120,496 B2
(45) Date of Patent: Nov. 6, 2018

(54) DISPLAY CONTROL APPARATUS AND CONTROL METHOD THEREOF

(71) Applicant: CANON KABUSHIKI KAISHA, Tokyo (JP)

(72) Inventor: Yuichiro Ishitsuka, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 23 days.

(21) Appl. No.: 15/399,891

(22) Filed: Jan. 6, 2017

(65) Prior Publication Data

US 2017/0199621 A1    Jul. 13, 2017

(30) Foreign Application Priority Data

Jan. 8, 2016    (JP) .................. 2016-002996

(51) Int. Cl.
| | | |
|---|---|---|
| G06F 3/048 | (2013.01) | |
| G06F 3/041 | (2006.01) | |
| G06F 3/0484 | (2013.01) | |
| H04N 5/232 | (2006.01) | |
| G06F 3/0488 | (2013.01) | |

(52) U.S. Cl.
CPC .......... G06F 3/0416 (2013.01); G06F 3/0412 (2013.01); G06F 3/04845 (2013.01); H04N 5/23216 (2013.01); G06F 3/04883 (2013.01); G06F 2203/04104 (2013.01); G06F 2203/04806 (2013.01); G06F 2203/04808 (2013.01)

(58) Field of Classification Search
None
See application file for complete search history.

(56) References Cited

U.S. PATENT DOCUMENTS

| 2013/0076888 A1 | 3/2013 | Hibino et al. |
| 2017/0177204 A1* | 6/2017 | Kangas ............... G06F 3/04845 |

FOREIGN PATENT DOCUMENTS

| CN | 102221954 A | 10/2011 |
| CN | 102402369 A | 4/2012 |
| CN | 103376999 A | 10/2013 |

(Continued)

OTHER PUBLICATIONS

The above foreign patent documents were cited in the Sep. 29, 2017 Taiwanese Office Action, enclosed with an English Translation, that issued in Taiwanese Patent Application No. 105141865.

(Continued)

Primary Examiner — Joseph R Haley
(74) Attorney, Agent, or Firm — Cowan, Liebowitz & Latman, P.C.

(57) ABSTRACT

A display control apparatus performs control, when a multi-touch operation is detected and a predetermined touch move operation is not detected, such that a display object displayed on the display unit is enlarged or reduced in accordance with the multi-touch operation with reference to a first position that is based on the positions at which the multi-touch operation is performed, and performs control, when a predetermined touch move operation and a multi-touch operation are detected, such that the display object displayed on the display unit is enlarged or reduced in accordance with the multi-touch operation with reference to a second position that is not based on the positions at which the multi-touch operation is performed.

19 Claims, 5 Drawing Sheets

(56) References Cited

FOREIGN PATENT DOCUMENTS

| | | |
|---|---|---|
| JP | 2015-055888 A | 3/2015 |
| TW | 201506734 A | 2/2015 |
| TW | 512168 U | 11/2015 |

OTHER PUBLICATIONS

The above documents were cited in a British Search Report dated Jun. 15, 2017, which is enclosed, that issued in the corresponding British Patent Application No. 1700102.5.

* cited by examiner

DISPLAY CONTROL APPARATUS AND CONTROL METHOD THEREOF

BACKGROUND OF THE INVENTION

Field of the Invention

The present invention relates to a display control apparatus and a control method thereof, particularly related to a display control method for displaying a display object by performing a touch operation.

Description of the Related Art

Japanese Patent Laid-Open No. 2015-055888 describes a technique for enlarging or reducing a display object (object) by performing a touch operation. In Japanese Patent Laid-Open No. 2015-055888, depending on whether or not a specific region is present in an operation screen that allows touch input, processing is switched between enlargement/reduction that is based on a touch position and enlargement/reduction that is not based on the touch position, even if the same touch operation is performed.

However, in Japanese Patent Laid-Open No. 2015-055888, a criterion for enlarged display or reduced display is determined in accordance with the display state of the screen before the touch operation was performed, and the user cannot select whether to enlarge/reduce a display object based on the touch position, or to enlarge/reduce the display object independently from the touch position. Thus, there have been cases where display control is not performed as intended by the user.

SUMMARY OF THE INVENTION

The present invention has been made in consideration of the aforementioned problems, and realizes a technique that makes it possible to perform display control as intended by a user by switching a criterion for enlargement or reduction, in accordance with whether or not a touch operation was performed before a touch operation for enlarging or reducing an image.

In order to solve the aforementioned problems, the present invention provides a display control apparatus comprising: a touch detection unit configured to detect a touch operation on a display unit; and a display control unit configured to: perform control, in a case where the touch detection unit detects a multi-touch operation on the display unit, and the touch detection unit does not detect a predetermined touch operation accompanied by movement of a touch position on the display unit maintained on the display unit from a time before detection of the multi-touch operation, such that a display object displayed on the display unit is enlarged or reduced in accordance with the multi-touch operation, with reference to a first position that is based on the positions at which the multi-touch operation is performed, and perform control, in a case where the touch detection unit detects a predetermined touch operation and the touch detection unit detects a multi-touch operation while at least one touch of the predetermined touch operation has been maintained after the predetermined touch operation was performed, such that the display object displayed on the display unit is enlarged or reduced in accordance with the multi-touch operation, with reference to a second position that is not based on the positions at which the multi-touch operation is performed.

In order to solve the aforementioned problems, the present invention provides a control method of a display control apparatus comprising: detecting a touch operation on a display unit; and performing control, in a case where a multi-touch operation on the display unit is detected, and a predetermined touch operation accompanied by movement of a touch position on the display unit maintained on the display unit from a time before detection of the multi-touch operation is not detected, such that a display object displayed on the display unit is enlarged or reduced in accordance with the multi-touch operation, with reference to a first position that is based on the positions at which the multi-touch operation is performed; and performing control, in a case where the predetermined touch operation is detected, and a multi-touch operation on the display unit is detected while at least one touch of the predetermined touch operation has been maintained after the predetermined touch operation was performed, such that the display object displayed on the display unit is enlarged or reduced in accordance with the multi-touch operation, with reference to a second position that is not based on the positions at which the multi-touch operation is performed.

In order to solve the aforementioned problems, the present invention provides a display control apparatus comprising: a touch detection unit configured to detect a touch operation on a display unit; and a display control unit configured to: perform control, in a case where a period after a predetermined touch operation accompanied by movement of a touch position on the display unit by the touch operation is detected is not within a predetermined period, and a multi-touch operation on the display unit is detected, such that a display object displayed on the display unit is enlarged or reduced in accordance with the multi-touch operation, with reference to a first position that is based on the positions at which the multi-touch operation is performed, and perform control, in a case where a multi-touch operation on the display unit is detected within the predetermined period after the predetermined touch operation was detected, such that the display object displayed on the display unit is enlarged or reduced in accordance with the multi-touch operation with reference to a second position that is not based on the positions at which the multi-touch operation is performed.

In order to solve the aforementioned problems, the present invention provides a control method of a display control apparatus comprising: detecting a touch operation on a display unit; performing control, in a case where a period after a predetermined touch operation accompanied by movement of a touch position on the display unit by the touch operation is detected is not within a predetermined period, and a multi-touch operation on the display unit is detected, such that a display object displayed on the display unit is enlarged or reduced in accordance with the multi-touch operation, with reference to a first position that is based on the positions at which the multi-touch operation is performed; and performing control, in a case where a multi-touch operation on the display unit is detected within the predetermined period after the predetermined touch operation was detected, such that the display object displayed on the display unit is enlarged or reduced in accordance with the multi-touch operation, with reference to a second position that is not based on the positions at which the multi-touch operation is performed.

According to the present invention, it is possible to perform display control as intended by the user by switching a criterion for enlargement or reduction, in accordance with whether or not a touch operation was performed before a touch operation for enlarging or reducing an image.

Further features of the present invention will become apparent from the following description of exemplary embodiments (with reference to the attached drawings).

DESCRIPTION OF THE EMBODIMENTS

Embodiments for implementing the present invention will be described below in detail. In the present embodiment, an example in which a display control apparatus is applied to a single-lens reflex digital camera as an image capturing apparatus will be described.

Apparatus Configuration

The configuration and functions of a digital camera according to the present embodiment will be described below with reference to FIGS. 1A, 1B and 2.

The external configuration of the digital camera 100 (referred to as "camera" below) according to the present embodiment will be described first with reference to FIGS. 1A and 1B.

Figure 1A:
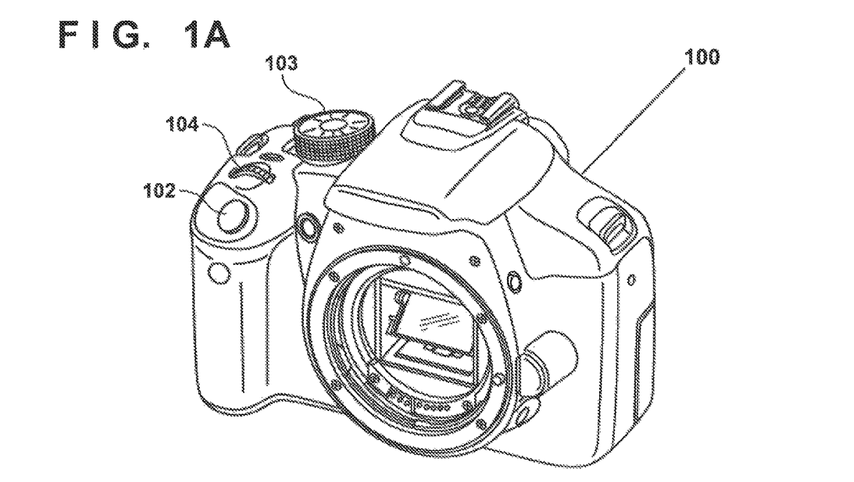
FIGS. 1A and 1B are diagrams showing an appearance of a display control apparatus according to a present embodiment.
Figure 1B:
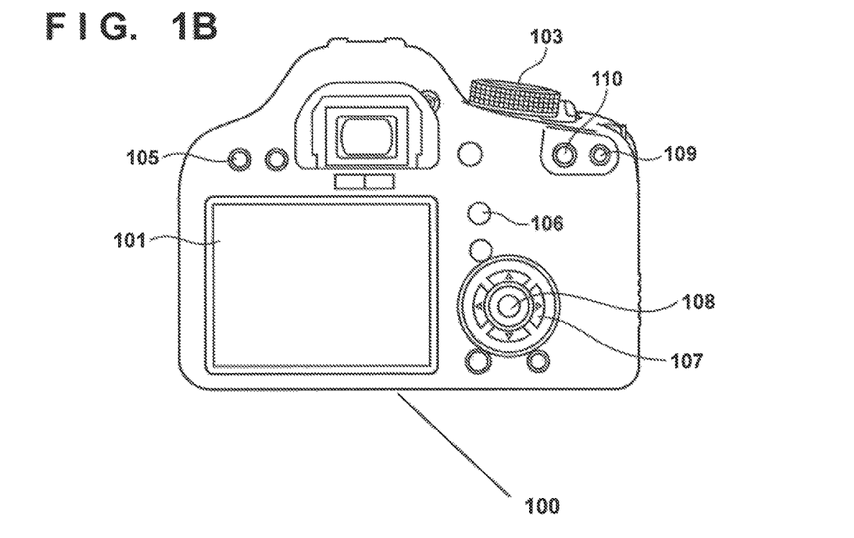

FIG. 1A is a front perspective view of the camera 100, and FIG. 1B is a back perspective view of the camera 100.

In FIGS. 1A and 1B, a display unit 101 is a display device arranged on a back surface of a camera body for displaying images and various types of information, such as an LCD. Moreover, the display unit 101 has a function of reproducing a still image after the still image was shot, a function of displaying a moving image that is being recorded, and a live view display function as well. A shutter-release button 102 is a push-button type operation member for giving a shooting instruction. A mode dial 103 is a rotating type operation member for switching between operation modes of the camera 100. A main dial 104 is a rotating operation member capable of changing setting values such as a shutter speed and a diaphragm aperture.

A menu button 105 is an operation member for displaying, on the display unit 101, a menu screen that enables various settings to be made. A shooting setting button 106 is an operation member for setting various shooting conditions in a shooting mode for shooting still images, moving images or the like. The cross key 107 is a movement instruction member capable of performing an operation in accordance with a pressed portion of the cross key 107, due to any one of up, down, left and right being pressed down. A SET button 108 is a push button, and is mainly used for determining a selection item and the like. An enlarge button 109 is an operation member for changing on/off of enlarged display in a live view, and changing the enlargement ratio of enlarged display. Also, the enlarge button 109 is an operation member for enlarging a reproduced image in a reproduction mode, and increasing the enlargement ratio. A reduce button 110 is an operation member for reducing the enlargement ratio of an enlarged reproduced image, and performing reduced display of the screen. Note that in enlarging processing and reducing processing by the enlarge button 109 and the reduce button 110, an image is always enlarged or reduced with reference to the center of the screen (image) of the display unit 101.

The camera 100 of the present embodiment has a power supply switch for the switching on/off of the power supply to the digital camera 100 and a live view button for the switching on/off of live view display. The camera 100 also has a grip portion having a shape that makes it easy to be grasped by a user's a right hand when he or she holds the camera 100.

Figure 2:
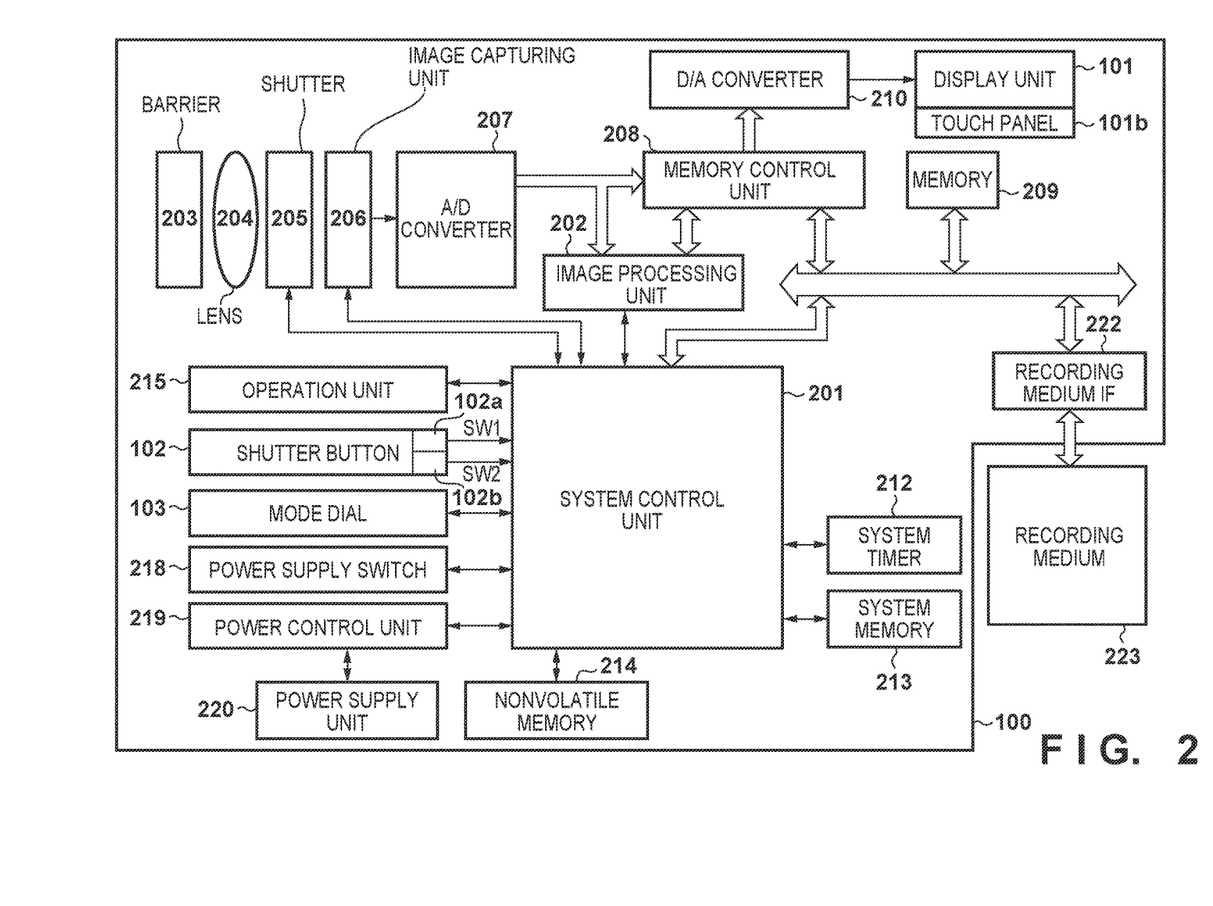
FIG. 2 is a block diagram showing an internal configuration of a display control apparatus according to the present embodiment.

FIG. 2 shows an internal configuration of the camera 100 according to the present embodiment.

In FIG. 2, a photographing lens 204 is a lens group that includes a zoom lens and a focusing lens. A shutter 205 has a diaphragm function. An image capturing unit 206 is an image sensor, which is constituted by a CCD, CMOS or the like, for converting the optical image of an object to an electric signal. An A/D converter 207 converts an analog signal to a digital signal. The A/D converter 207 is used to convert an analog signal, which is output from the image capturing unit 206, to a digital signal. A barrier 203 covers the image capturing system which includes the photographing lens 204 of the camera 100, thereby preventing contamination of and damage to the image capturing system that includes the photographing lens 204, a shutter 205 and image capturing unit 206. Note that the photographing lens 204 may be fixed to or detachable from the camera 100.

An image processing unit 202 performs resizing processing, such as predetermined pixel interpolation and reduction, and color conversion processing, on data from the A/D converter 207 or data from a memory control unit 208. Further, the image processing unit 202 performs predetermined calculation processing using the captured image data, and a system control unit 201 performs exposure control and distance measuring control based on the calculation results. Thus, AF (Automatic Focus) processing, AE (Automatic Exposure) processing, and EF (flash pre-emission) processing of TTL (Through the Lens) type are performed. Furthermore, the image processing unit 202 performs predetermined calculation processing using the captured image data, and AWB (Automatic White Balance) processing of TTL type is performed on the basis of the calculation results.

The output data from the A/D converter 207 is directly written into a memory 209 via both the image processing unit 202 and the memory control unit 208 or via the memory control unit 208. The memory 209 stores the image data obtained from the image capturing unit 206 and converted into digital data by the A/D converter 207, and image display data to be displayed on the display unit 101. The memory 209 has a storage capacity that is sufficient for storing a predetermined number of still images as well as moving images and audio for a predetermined time period.

The memory 209 also functions as a memory for image display (video memory). A D/A converter 210 converts the image display data stored in the memory 209 into an analog signal and supplies the display unit 101 with the analog signal. The image display data that was written into the memory 209 is displayed by the display unit 101 via the D/A converter 210. The display unit 101 performs, on a display device such as an LCD, display in accordance with the analog signal from the D/A converter 210. The digital signals once converted by the A/D converter 207 and stored in the memory 209 are converted into analog signals by the D/A converter 210, and the analog signals are successively transmitted to the display unit 101 so as to be displayed thereon, making it possible to realize an electronic view finder (EVF) functionality and to perform through the lens image display by a live view. The display unit 101 is a variable angle type display in which the user can freely change the direction and the angle of a display face of the variable angle type display relative to the camera 100, and rotate the variable angle type display.

A nonvolatile memory 214 is, for example, an EEPROM, which is electrically erasable and recordable. In the nonvolatile memory 214, constants and programs, for example, for operating the system control unit 201 are stored. In this context, "programs" may refer to programs for executing a flowchart for display control processing that will be described later.

The system control unit 201 is a calculation processing device for performing overall control of the camera 100, and realizes, by executing the programs stored in the nonvolatile memory 214, the display control processing of the present embodiment that will be described later. The system memory 213 is, for example, a RAM and used also as a work memory where constants and variables for operating the system control unit 201, and the programs read out from the nonvolatile memory 214 are expanded. The system control unit 201 controls the memory 209, the D/A converter 210, the display unit 101, and the like, so as to perform display control.

A system timer 212 is a timer circuit for measuring time periods for various types of controls and the time of an integrated clock.

The mode dial 103, a first shutter switch 102a, a second shutter switch 102b and operation units 215 are operation members for inputting various types of instructions into the system control unit 201.

The mode dial 103 switches the operation mode of the system control unit 201 to any of a still image shooting mode, a moving image recording mode, and a reproduction mode. The still image shooting mode includes an automatic shooting mode, an automatic scene determination mode, a manual mode, scene-specific shooting modes, a program AE mode, a custom mode, and the like. Using the mode dial 103, the mode is directly switched to any of the plurality of modes included in the still image shooting mode. Alternatively, it is also possible to switch, using the mode dial 103, to the still image shooting mode and then to switch, using another operation member, to any of the plurality of modes included in the still image shooting mode. Similarly, also the moving image recording mode may include a plurality of modes.

While the shutter-release button 102 provided on the camera 100 is being operated, that is, pressed half-way (the shooting preparation instruction), the first shutter switch 102a is turned on and generates a first shutter switch signal SW1. Upon receiving the first shutter switch signal SW1, the system control unit 201 causes the image processing unit 202 to start the AF (Automatic Focus) processing, the AE (Automatic Exposure) processing, the AWB (Automatic White Balance) processing, the EF (flash pre-emission) processing and the like.

When the operation of the shutter-release button 102 is completed, that is, the shutter-release button 102 is pressed fully (the shooting instruction), the second shutter switch 102b is turned on and generates a second shutter switch signal SW2. Upon receiving the second shutter switch signal SW2, the system control unit 201 starts a series of shooting processing from reading out the signal from the image capturing unit 206 to writing of image data to a recording medium 223.

By selecting various functional icons displayed on the display unit 101, appropriate functions for each situation are assigned to each operation member of the operation units 215, and the operation units 215 thus act as various function buttons. Examples of these function buttons include an end button, a back button, an image scrolling button, a jump button, a narrow-down button, an attribute change button and the like. For example, a menu screen that enables various settings to be made is displayed on the display unit 101 by pressing the menu button 105. The user can make various settings intuitively by using the menu screen, which is displayed on the display unit 101, a cross key 107 and the SET button 108.

Included among the operation units 215 is also a touch panel (touch screen) 101b that is capable of detecting a touch operation on the display unit 101. The touch panel 101b and the display unit 101 can be constructed as a single integrated unit. For example, the touch panel 101b is constructed in such a manner that the transmittance of light will not interfere with the display presented by the display unit 101, and it is attached to the uppermost layer of the display face of the display unit 101. In addition, input coordinates on the touch panel 101b and display coordinates on the display unit 101 are correlated. As a result, a GUI can be constructed that makes it possible for the user to directly manipulate the screen displayed on the display unit 101. The system control unit 201 is capable of detecting the following touch operations and conditions performed by contacting the touch panel 101b.

Touching of the touch panel 101b using a finger or pen (referred to as "touch-down" below).
A state in which the touch panel 101b is in contact with a finger or pen (referred to as "touch-on" below).
Movement of a finger or pen while in contact with the touch panel 101b (referred to as "touch-move" below).
Lifting of a finger or pen that has been in contact with the touch panel 101b (referred to as "touch-up" below).
A state in which the touch panel 101b is not being touched at all (referred to as "touch-off" below).

These operations and position coordinates at which the touch panel 101b is being touched by the finger or pen are communicated to the system control unit 201 through an internal bus, and based upon the information thus communicated, the system control unit 201 determines what kind of operation was performed on the touch panel 101b. As for "touch-move", the determination can be made also for every vertical component and horizontal component with regard to the direction of movement of the finger or pen, which is moved on the touch panel 101b, based upon a change in the coordinate position. Further, it is assumed that a stroke has been made when "touch-up" is performed following a regular "touch-move" after a "touch-down" on the touch panel 101b. A very quick stroke action is referred to as a "flick". A "flick" is an operation in which, with fingers being in contact with the touch panel 101b, the fingers are moved rapidly over a certain distance and then lifted. In other words, this is a rapid tracing operation in which the fingers are flicked across the surface of the touch panel 101b. The system control unit 201 can determine that a "flick" has been performed when it detects such movement over a predetermined distance or greater and at a predetermined speed or greater and then detects "touch-up". Further, the system control unit 201 can determine that "drag" has been performed if it detects movement over a predetermined distance or greater at a speed less than a predetermined speed. Moreover, an operation of narrowing the distance between two points in a state where the touch panel 101b is touched with fingers or pens at two positions (two points) at the same time is referred to as "pinch-in". Specifically, pinch-in is an operation of bringing the fingers close to each other while the touch panel 101b is touched with these fingers at two points (an operation of narrowing the distance between a plurality of touch positions). In other words, pinch-in is an operation of moving two fingers across the touch panel 101b as if pinching an object such as an image displayed on the touch panel 101b. In contrast to pinch-in, an operation of widening the distance between two points in a state where the touch panel 101b is touched with fingers or pens at the two points (an operation of widening the distance between a plurality of touch positions) at the same time is referred to as pinch-out. The touch panel 101b may employ a method that relies upon any of the following: resistive film, electrostatic capacitance, surface acoustic waves, infrared radiation, electromagnetic induction, image recognition and optical sensing.

A power control unit 219 is constituted by, for example, a battery detection circuit, a DC-DC converter, a switch circuit for changing over the block to be supplied with power, and detects whether a battery has been inserted or not, the type of the battery, and the residual capacity thereof. Further, the power control unit 219 controls the DC-DC converter in accordance with the detection results and an instruction of the system control unit 201, and supplies a necessary voltage for a necessary length of time to each of the units including the recording medium 223.

A power supply unit 220 comprises a primary battery such as an alkaline battery or a lithium battery, a secondary battery such as an NiCd battery, an NiMH battery, or an Li-ion battery, or an AC adaptor. A recording medium interface (I/F) 222 is for interfacing with the recording medium 223 such as a memory card or a hard disk. The recording medium 223 is a recording medium such as a memory card for recording shot images, and constituted by a semiconductor memory, a magnetic disk, or the like.

In addition, the camera 100 of the present embodiment has a communication unit that transmits/receives video and sound to/from an external device communicably connected via a wireless antenna or wired cable. A personal computer, a tablet terminal, which is a kind of a personal computer, a printer, another digital camera, a smart phone, which is a kind of a mobile telephone terminal, various service providing servers, and the like are assumed as the external device.

Note that the hardware configuration is not limited to that shown in FIG. 2, and a configuration is also possible in which, for example, a single item of hardware performs display control, communication control, shooting control, image processing control, and the like, so as to function as each unit or block of the camera 100. Alternatively, it is also possible that a plurality of items of hardware operate in cooperation with each other to function as a single unit or block.

Display Control Processing

Next, display control operations of the camera 100 of the present embodiment will be described with reference to FIGS. 3A to 5.

FIGS. 3A to 3E show a display example in a case where first enlarging processing for performing enlarged display with reference to the center between two touch positions by performing pinch-out is performed, and in a case where second enlarging processing for performing enlarged display with reference to the center of the screen independently from touch positions is performed, in order to perform enlarged display on an image displayed on a display screen of the display unit 101.

Figure 3A:
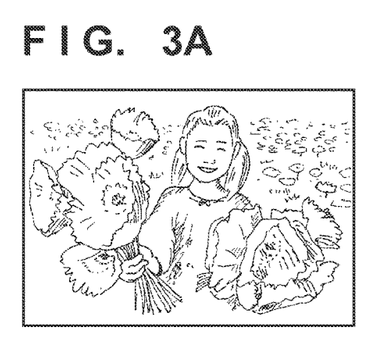
FIGS. 3A to 3E are diagrams illustrating display control according to the present embodiment.
Figure 3B:
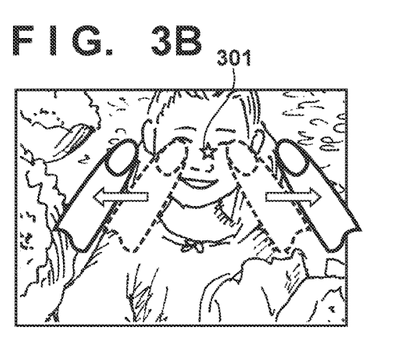

FIG. 3A shows a state in which an entire image is displayed on the display screen of the display unit 101 without being enlarged. FIG. 3B shows a display example of first enlarging processing for performing enlarged display with reference to the center (center point) between touch positions at which pinch-out was performed on the display screen. In FIG. 3B, the image is enlarged with reference to a center 301 between the two touch positions at an enlargement ratio that is based on the distance between the two touch positions. Accordingly, a subject portion (in the examples in FIGS. 3A and 3B, around the nose of the girl) positioned at the center 301 between the touch positions that serves as an enlargement reference does not change its position on the display screen before and after the enlargement (FIGS. 3A and 3B). On the other hand, the positions of subject portions that are not positioned at the center 301 between the touch positions that serves as an enlargement reference change concentrically with the center 301 between the touch positions before and after the enlargement (FIGS. 3A and 3B), as the image is enlarged. For example, the left ear of the girl in FIG. 3B is larger than the left ear of the girl in FIG. 3A and is shifted to the left, and the right ear of the girl in FIG. 3B is larger than the right ear of the girl in FIG. 3A and is shifted to the right. In such first enlarging processing, by touching with two fingers at the same time at a position at which the image is desired to be enlarged and viewed (for example, the face of the girl) and then widening the distance between the fingers, the image is enlarged at the desired position without being shifted substantially. In the example in FIG. 3B, the face of the girl after being enlarged does not protrude to the outside of the screen and can be recognized visually. In the first enlarging processing, in this manner, an image can be intuitively enlarged and checked at a position at which the user desires to enlarge and view the image, with less operation procedures.

Figure 3C:
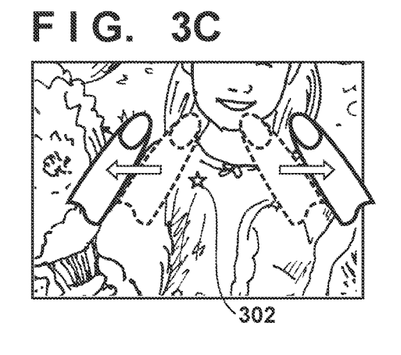

FIG. 3C shows a first display example of second enlarging processing for performing enlarged display with reference to the center of the screen regardless of touch positions. In FIG. 3C, regardless of the positions at which touch is detected, the image is enlarged with reference to a center 302 of the display screen (region in which the image is displayed) at an enlargement ratio that is based on the distance between the two touch positions. Accordingly, a subject portion (in the examples in FIGS. 3A and 3C, around the chest of the girl) positioned at the center 302 of the display screen, which serves as an enlargement reference, does not change in its position on the display screen before and after the enlargement (FIGS. 3A and 3C). On the other hand, subject portions that are not at the center 302 of the display screen, which serves as an enlargement reference, change in their positions concentrically with the center 302 of the display screen before and after the enlargement (FIGS. 3A and 3C), as the image is enlarged. If the center 302 of the display screen as described above and an enlargement reference point match, the position of the subject portion changes concentrically with the center of the screen before and after enlargement, thereby making it easy to understand the positional relation in the screen before and after the enlargement. In addition, enlargement that uses the center 302 of the display screen as an enlargement reference is the same as optical zooming during shooting in that the position of a subject portion changes concentrically with the center of the screen before and after the enlargement, and is intuitive. Also in the case of using the enlarge button 109, enlarged display is performed (second enlarging processing is performed) with reference to the center (image portion positioned at the center of the display area of the image) of the screen (display area of the image). In the case where a screen in which a display area of an image and a display area of another display item are separated (not illustrated) is displayed, enlarged display is performed with reference to the center of the display area of the image (second enlarging processing is performed), even if a pinch operation is performed at the position of the display area of the other display item in which the image is not displayed.

Figure 3D:
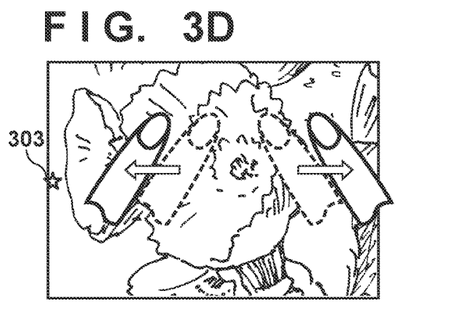

FIG. 3D shows a second display example of second enlarging processing that is not based on touch positions, in the case where enlarged display is performed with reference to an edge portion 303 of a side of a display screen (image). The processing in FIG. 3D is useful when a subject near the edge portion 303 of the image or the like is desired to be enlarged and checked. In a case where a range in which an edge portion of an image is displayed is displayed in a state where the image is enlarged, it can be assumed that the user is focused on the edge portion of the image. The edge portion 303 of the image is often displayed at an edge portion of the display screen, and it is difficult for the user to perform a pinch operation (pinch-out) at the edge portion of the display screen so as to perform enlarged display based on the two touch positions. In view of this, in the present embodiment, if a portion including an edge portion of an image is displayed as in FIG. 3D, enlarging/reducing processing is performed with reference to the center (in the example in FIG. 3D, the edge portion 303 that is the vertical center of the left edge portion) of the displayed edge portion (side) in accordance with pinch-out/pinch-in. This enables enlarged display to be performed with reference to the edge portion 303 of the image by performing pinch-out at the center of the screen, and it is not necessary to perform a pinch operation at the edge portion of the display screen. In the case of enlarging the image with reference to the center of the screen as in FIG. 3C, the edge portion 303 of the image shifts to the outside of the display range of the display screen, but in enlargement with reference to the edge portion 303 of the image, the position of the subject portion changes concentrically with the edge portion 303. Therefore, if enlargement with reference to the edge portion 303 on the left of the image is performed in a state in FIG. 3D, there is no portion that shifts to the left as the image is enlarged. By performing enlarged display in this manner, there is an advantage that it is not necessary to change the display position by performing touch-move in order to view the left edge portion after being enlarged.

Figure 3E:
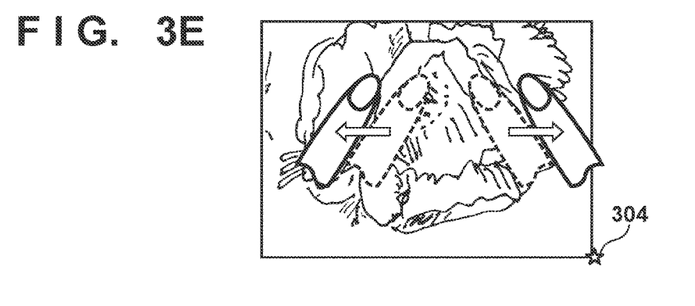

FIG. 3E is a third display example of second enlarging processing that is not based on touch positions, in a case where enlarging processing is performed with reference to a corner portion 304 at which two sides of the display screen (image) intersect. The processing in FIG. 3E is effective in cases such as where a subject at an edge portion of an image, in particular, at a corner portion of a display screen, or the like is desired to be enlarged and viewed. In the present embodiment, in the case where a portion including an apex portion (a corner portion) of an image is displayed as in FIG. 3E, enlarging/reducing processing is performed with reference to the center (in the example in FIG. 3E, the corner portion 304 that is the lower right apex of the image) of the displayed apex portion (corner portion) in accordance with pinch-out/"pinch-in". In enlargement with reference to the corner portion 304 of the image, the position of a subject portion changes concentrically with the corner portion 304. Therefore, if enlargement with reference to the corner portion 304 of the image is performed in a state shown in FIG. 3E, there is no portion that shifts to the right or downward as the image is enlarged. Accordingly, the subject portion positioned at the corner portion 304 does not move from the lower right portion of the display screen before and after the enlargement. This enables the user to perform enlarged display at an enlargement ratio that is based on the distance between two touch positions such that the corner portion 304 of the image does not protrude from the display range, by performing pinch-out at the center of the screen, and it is not necessary to perform a pinch operation at the corner portion of the display screen.

FIGS. 4A to 4H show a display example in a case where, when performing enlarged display of an image by performing a pinch operation on a display screen, a switch is made between performing first enlarging processing that is based on the touch positions and performing second enlarging processing that is not based on the touch positions, in accordance with a predetermined touch operation (touch-move) that continues from before the pinch operation was performed. In the present embodiment, control is performed such that, if an operation of changing the display position of an image by performing touch-move is performed before pinch-out is detected, second enlarging processing is performed, and if an operation of changing the display position of the image by performing touch-move is not performed before pinch-out is detected, first enlarging processing is performed.

Figure 4A:
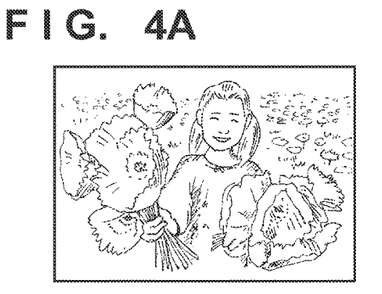
FIGS. 4A to 4H are diagrams showing an example of enlarged display after touch-move according to the present embodiment
Figure 4B:
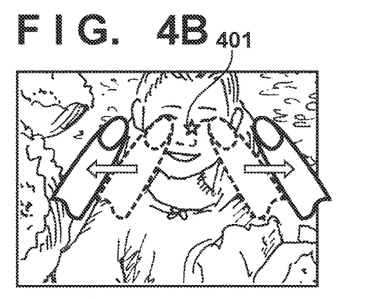

FIG. 4A shows a state in which the entire image is displayed on the display screen of the display unit 101 without being enlarged. FIG. 4B shows a state in which enlarged display is performed by performing pinch-out from the display state in FIG. 4A. In FIG. 4B, the display position of the image was not changed by performing touch-move before pinch-out is detected, and thus first enlarging processing that is based on the touch positions is performed. Accordingly, in FIG. 4B, enlarged display is performed on the image with reference to a center 401 between the two touch positions at an enlargement ratio that is based on the distance between the two touch positions, and thus the user can perform enlargement such that a portion (around the center between the touch positions) of the image desired to be enlarged and viewed moves in a smaller amount as the image is enlarged, and can perform enlarged display while adjusting the distance between the two touch positions by performing pinch-out.

Figure 4C:
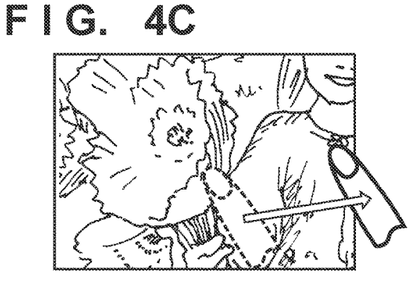

FIG. 4C shows a display example in a case where the display position (display range) of the image is changed by performing touch-move at one point (one location) from the display state of the image enlarged as described with reference to FIG. 4B, and after the touch-move was performed, the touch has not been lifted and touch-on is maintained. If the display range was changed (scrolled) by performing touch-move when a portion of the display object (image) is displayed (enlarged, for example), it is assumed that the user changed the display range such that a portion desired to be viewed (portion of interest) would be displayed at the center of the screen. In the example in FIG. 4C, the display position is changed by performing touch-move such that in the image, the flower in the right hand of the girl, a large portion of which is positioned outside the screen on the left (out of the display range) in FIG. 4B, is fitted within the display screen. The flower portion moved to near the center of the screen in this manner is considered to be a portion of interest. As a result of displaying, on the screen, the flower that is a subject of interest, the user may desire to view the flower that is enlarged to a further degree.

Figure 4D:
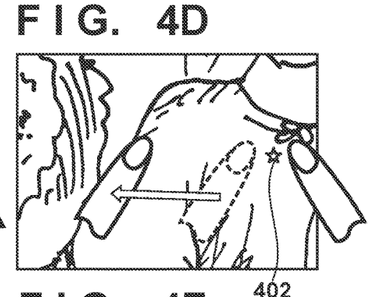

FIG. 4D is a diagram illustrating an example in which the present embodiment is not applied, in the case where the display state in FIG. 4C is obtained by performing touch-move at a first point, after which additional touch is performed at a second point without releasing the touch at the first point, and enlarging processing is performed by performing pinch-out. If first enlarging processing for enlarging the image with reference to a center 402 between the first touch point and the second touch point is performed, the enlarged display state as shown in FIG. 4D is obtained. In FIG. 4D, the portion of interest (flower) of the subject that was moved to the center of the screen by performing touch-move as in FIG. 4C is shifted to the outside of the display range of the screen (outside on the left), and a large portion of the portion of interest cannot be seen any longer. Accordingly, the user cannot view the enlarged flower. In order to view the enlarged portion of interest, the user needs to further perform touch-move so as to change the display position of the image such that the portion of interest is fitted within the display screen.

Figure 4E:
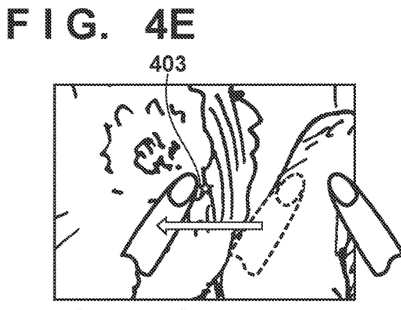

On the other hand, FIG. 4E is a diagram illustrating an example in which the present embodiment is applied, in the case where the display state in FIG. 4C is obtained by performing touch-move at a first point, after which additional touch is performed at a second point without releasing the touch at the first touch point, and enlarging processing is performed by performing pinch-out. In the present embodiment, the above-described second enlarging processing is performed in this case. Accordingly, the reference position for enlargement/reduction in this case is a center 403 of the display screen, and the display state as in FIG. 4E is obtained after enlargement from the state in FIG. 4C. In FIG. 4E, the portion of interest (flower) of the subject that was moved to the center of the screen by performing touch-move as in FIG. 4C is enlarged and positioned within the display screen. Accordingly, the user can view the enlarged flower without performing additional touch-move. If the screen size of the display unit 101 is large, an advantage that a portion of interest can be viewed without performing additional touch-move after pinch-out is particularly significant, since it is possible to omit a touch operation of greatly moving the touch position. Note that pinch operations in FIGS. 4D and 4E are similar, but the result of performing enlarging processing is different between the case where first enlarging processing is performed and the case where second enlarging processing is performed.

Figure 4F:
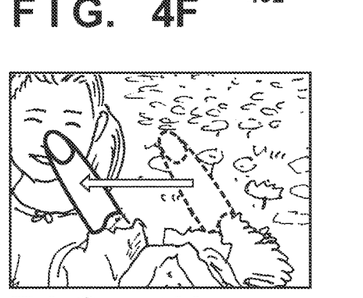

FIG. 4F shows a state in which the display position of the image is changed by performing touch-move from the display state of the enlarged image in FIG. 4B. FIG. 4F shows a display example in the case where touch-move for changing the display range to the right edge of the image (i.e. the display range is moved until the right edge of the image reaches within the display screen) was performed and touch-down has been maintained after the touch-move was performed. If the display range is changed to an edge portion of the display object (image) in this manner, the edge portion of the display object (image) that is being displayed is considered to be a portion of interest. For example, if a display object is a captured image as in the present embodiment, there are cases where an edge portion is used as a portion of interest in order to check whether or not the subject desired to be shot is fitted within the image, or an unnecessary subject is included. As a result of displaying, on the screen, an image edge portion that is a subject of interest, the user may desire to view the edge portion that is enlarged to a further degree.

Figure 4G:
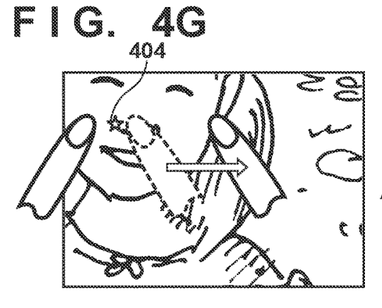

FIG. 4G is a diagram illustrating an example in which the present embodiment is not applied, in the case where the display state in FIG. 4F is obtained by performing touch-move at a first point, after which additional touch is performed at a second point without releasing the touch at the first point, and enlarging processing is performed by performing pinch-out. If first enlarging processing for enlarging the image with reference to a center 404 between the first touch point and the second touch point is performed, the display state after the enlargement as in FIG. 4G is obtained. In FIG. 4G, the edge portion (right end) of the image that was fitted within the display range as in FIG. 4F by performing touch-move is shifted to the outside (outside on the right) of the display range, and the right edge that is the portion of interest cannot be viewed any longer. Accordingly, the user cannot check whether or not a subject desired to be shot is fitted within the image, or an unnecessary subject is included. In order to view the enlarged portion of interest (right edge portion), the user needs to perform additional touch-move so as to change the display position of the image such that the portion of interest (right edge portion) is fitted within the display screen.

Figure 4H:
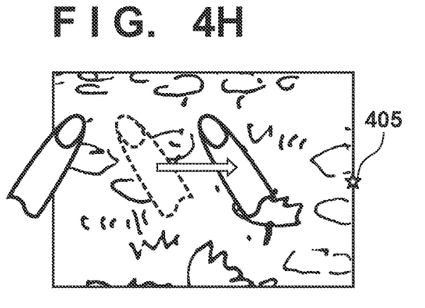

Also, FIG. 4H is a diagram illustrating an example in which the present embodiment is applied, in the case where the display state in FIG. 4F is obtained by performing touch-move at the first touch point, after which additional touch is performed at a second point without releasing the touch at the first touch point, and enlarging processing is performed by performing pinch-out. In the present embodiment, the above-described second enlarging processing is performed in this case. Accordingly, an edge portion 405 of the image serves as a reference position for enlargement/reduction in this case, and the display state as in FIG. 4H is obtained after the enlargement from the state in FIG. 4F. Note that the edge portion 405 that serves as the reference for enlargement/reduction is the center point in the length direction of the edge portion (side) that is being displayed. The center point in the length direction of the side of the edge portion of the screen, that is, in FIG. 4H, a portion of interest (right edge of the image) of the subject that was moved to within the display range as in FIG. 4F by performing touch-move is enlarged and positioned within the display screen. Accordingly, the user can view the enlarged right end, and can check whether or not a subject desired to be shot is fitted inward from the right end, or an unnecessary subject is included in the right end, without performing additional touch-move. The pinch operations in FIGS. 4G and 4H are similar, but the result of performing enlarging processing is different between the case where first enlarging processing is performed and the case where second enlarging processing is performed. Moreover, as described with reference to FIG. 3E, in the case where the display range reaches an apex/corner of the display object (in other words, in the case where the display range reaches two consecutive sides of the display object), enlargement/reduction is performed with reference to the apex that reaches the display range.

Figure 5:
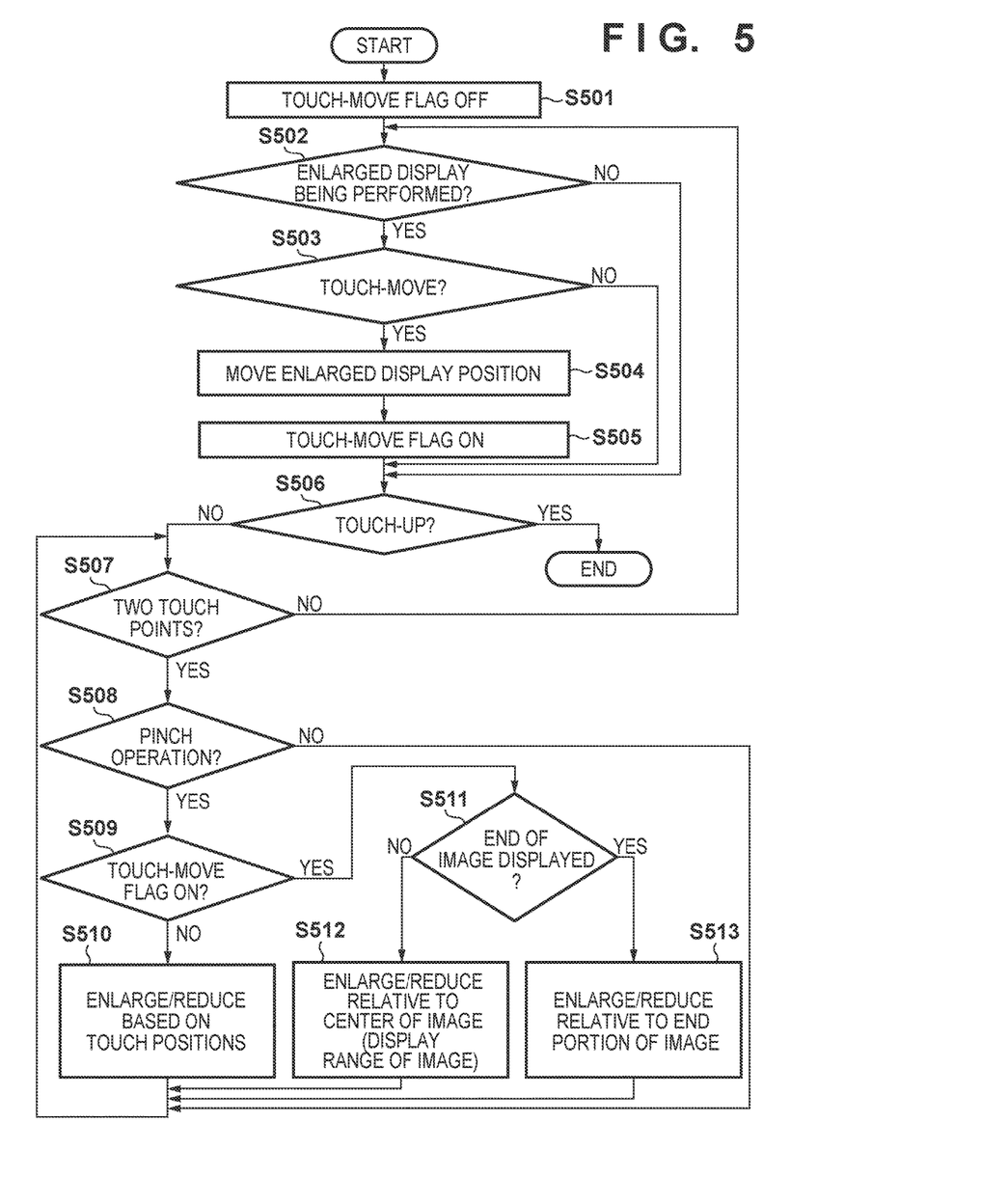
FIG. 5 is a flowchart showing display control processing according to the present embodiment.

FIG. 5 shows display control processing for enlarging or reducing an image performed by the camera 100 of the present embodiment. Note that the processing in FIG. 5 is realized by loading a program stored in the nonvolatile memory 214 to the system memory 213 and by the system control unit 201 executing the program. Also, the processing in FIG. 5 starts when a touch (touch-down) operation on the display unit 101 (the touch panel 101*b*) is detected, in a state where the operation mode of the camera 100 is set to the reproduction mode or the like, and the image is read from the recording medium 223 and is displayed on the display unit 101.

In step S501, the system control unit 201 turns off a touch-move flag, and the procedure advances to step S502.

In step S502, the system control unit 201 determines whether or not enlarged display is being performed on the image displayed on the display unit 101. If enlarged display is being performed, the procedure advances to step S503, and if enlarged display is not being performed, the procedure advances to step S506.

In step S503, the system control unit 201 determines whether or not touch-move in a state where the screen is touched at one location has been detected. In the case where such touch-move has been detected, the procedure advances to step S504, and in the case where such touch-move has not been detected, the procedure advances to step S506.

In step S504, the system control unit 201 changes the display position of the image under enlarged display in accordance with the movement amount of the touch-move detected in step S503, and the procedure advances to step S505. Note that if touch-move is detected in a state where the screen is touched at one location and enlarged display is not being performed (NO is determined in step S502), an image switch is made for switching the image that is being display to another image, although this processing is omitted in the flowchart in FIG. 5.

In step S505, the system control unit 201 turns on the touch-move flag, and the procedure advances to step S506. However, in the case where the movement of the touch-move is not greater than or equal to a predetermined amount (the movement amount is small) in step S504, the touch-move flag does not need to be changed. This is because enlarging processing by performing pinch-out is switched between first enlarging processing that is based on the touch positions and second enlarging processing that is not based on the touch positions, in accordance with whether the setting of the touch-move flag is on or off, but if the touch-move flag is turned on merely by slightly moving the display position in order to finely adjust the display position, the reference position for enlarging processing fluctuates inadvertently, which may be against the user's intention. Accordingly, even when touch-move that causes the enlarged display position to move is performed, if the movement of the display position is a slight movement that is smaller than a predetermined amount, the touch-move flag is not turned on (first enlarging processing is adopted as enlarging processing by a pinch operation, which will be described later). Note that the processing of steps S504 and S505 is processing that is based on a touch operation (single touch operation) performed by touching the screen at one point (one location) in the case where touch-down at one point (one location) after the touch-off state is detected. In the case where simultaneous or substantially simultaneous touch-down at a plurality of points (at a plurality of locations) after the touch-off state is detected, NO is determined in step S503 after the processing of steps S501 and S502, and the procedure advances to step S506, which will be described later.

In step S506, the system control unit 201 determines whether or not touch-up at all the touch locations has been detected. If touch-up at all the touch locations has been detected, a touch-off state is entered, and thus the processing of this flowchart ends. If touch-up at all the touch locations has not been detected, the procedure advances to step S507.

In step S507, the system control unit 201 determines whether or not a multi-touch operation has been performed in which a touch operation (touch at two points or more) is performed at a plurality of locations (two locations) in the touch panel. In the case where a multi-touch operation has not been performed, the procedure advances to step S502, and in the case of a multi-touch operation, the procedure advances to step S508. In the case where touch-down at one point (one location) after the touch-off state is detected, and touch-down at a second point without touch-up is then performed, it is determined in step S507 that a multi-touch operation has been performed. In addition, in the case where simultaneous or substantially simultaneous touch-down at a plurality of points (a plurality of locations) after the touch-off state is detected as well, NO is determined in step S503 after the processing of steps S501 and S502, and it is determined in step S506 that a multi-touch operation has been performed. Note that in the present embodiment, even touch at three points (three locations) or more is processed as a multi-touch operation by two-point touch, and touch at the third point or later is disregarded. However, in the case where a function corresponding to a touch operation at three points (three locations) or more has been assigned, NO is determined in step S507, and processing corresponds to touch at three points or more may be performed.

In step S508, the system control unit 201 determines whether or not a pinch operation (pinch-out or pinch-in) has been performed. In the case where a pinch operation has been performed, the procedure advances to step S509, and in the case where a pinch operation has not been performed, the procedure returns to step S507.

In step S509, the system control unit 201 determines whether or not the touch-move flag is on. If the touch-move flag is on, the procedure advances to step S511, and if the touch-move flag is off, the procedure advances to step S510.

In step S510, the system control unit 201 performs enlarging processing (first enlarging processing) or reducing processing on the image with reference to the center between the two touch positions in accordance with the pinch operation, and the procedure returns to step S507. Accordingly, the above-described enlarging processing that causes the change from FIG. 4A to FIG. 4B is performed. Note that even if the display range reaches an edge portion of the image during the pinch operation, the center between the two touch positions continuously serves as a reference for enlargement/reduction. In this case, the display range after the enlargement or reduction is corrected (offset) as needed such that a range that is beyond an edge portion of the image is not displayed. Accordingly, a configuration is adopted in which, in the case where the display range is beyond an edge portion of the image when enlargement or reduction is performed with reference to the center between the two touch positions, the edge of the display range matches the edge portion of the image.

In step S511, the system control unit 201 determines whether or not an edge portion of the image is displayed at an edge portion of the display area (screen) of the image (whether or not the display range reaches an edge of the image). In the case where an edge portion is displayed, the procedure advances to step S513, and in the case where an edge portion is not displayed, the procedure advances to step S512. The case where an edge portion of the image is displayed at an edge portion of the display area (screen) of the image also includes the case where an apex (corner) of the image is displayed in the display area (screen) of the image, and the procedure advances to step S513. This determination is a determination as to whether or not an edge portion of the image is displayed at an edge portion of the display area (screen) of the image by a scroll (display range change) operation achieved by performing touch-move by a single touch. As described above, in the case where an edge portion of the image reaches an edge portion of the display area (screen) of the image as a result of enlargement/reduction, YES is not determined in this determination.

In step S512, the system control unit 201 performs enlarging processing (second enlarging processing) or reducing processing on the image with reference to the center of the display screen (display area of the image), and the procedure returns to step S507. Accordingly, the above-described enlarging processing that causes the change from FIG. 4C to FIG. 4D is performed. Specifically, by changing the display range such that a portion of interest is positioned near the center of the display range by performing touch-move by a single touch, and then performing pinch-out by a multi-touch operation without releasing the touch, the portion of interest can be enlarged and checked.

In step S513, the system control unit 201 performs enlarging processing (second enlarging processing) or reducing processing on the image with reference to the edge portion of the image positioned at the edge portion of the display screen, and returns the procedure to step S507. As described above, in the case where the display range reaches one edge portion of the image, the center point in the length direction of that edge portion serves as a reference point for enlargement/reduction. In the case where the display range reaches two consecutive edge portions of the image (apex/corner of the image), the apex (corner) of those two edge portions serves as a reference point for enlargement/reduction. In the processing of step S513, the above-described enlarging processing that causes the change from FIG. 4F to FIG. 4H is performed.

According to the above processing, by changing the display range by performing touch-move by a single touch, and then performing pinch-out without releasing the touch, second enlarging processing with reference to the center of the screen or an edge of the screen is performed. Also, by performing pinch-out by touch-move by a single touch without changing the display range, first enlarging processing with reference to the center point between two touch positions is performed. Furthermore, every time touch-down after touch-off is detected, the touch-move flag is turned off. Therefore, even after the display range is changed by touch-move by a single touch, first enlarging processing with reference to the center point between the two touch positions is performed by releasing the touch and then performing pinch-out without touch-move by a single touch. As described above, according to the present embodiment, a switch is made between performing enlarged display that based on touch positions and performing enlarged display that is not based on touch positions, in accordance with whether or not the display range was changed by performing touch-move before pinch-out was performed, and thus it becomes possible to perform enlarged display as intended by the user.

Note that in the present embodiment, the reference position for enlargement may be notified to the user by performing display of a figure and a symbol such as "301" in FIG. 3B or highlight display at the reference position for enlarging processing, in accordance with detection of two-point touch. By viewing a notification displayed on the screen, the user can understand the reference position for enlargement/reduction that changes in accordance with the situation as steps S510, S512 and S513 of the present embodiment, and thus can comfortably perform an enlarging operation at the target position (portion of interest) without confusion.

In addition, in the present embodiment, an example of enlarging processing by performing pinch-out has been described for the purpose of simplifying the description, but reducing processing by performing pinch-in is similar. Accordingly, display control of the present embodiment is not limited to pinch-out, and can also be applied to pinch-in.

Also, in the present embodiment, an image is used as a display object, but there is no limitation to this, and the present embodiment is applicable to any display object as long as the range of the display object that is larger than the display area is partially displayed. Accordingly, the display object may be at least one of a document, a Web page containing a document and images, a map and the like.

Variation

In above-described embodiment, an example has been described in which, in the case where a pinch operation without touch-move by a single touch was performed after touch-off, first enlarging processing in which a position that is based on the touch positions serves as a reference position for enlargement/reduction is performed. As a variation, even after a touch-off state is entered, if a touch operation is performed during a predetermined period from a previous touch operation, enlarging processing with reference to the same reference as the previous touch operation may be performed. As processing for realizing this, first, if YES is determined in the above-described step S506 in FIG. 5 (if determined that touch-up has been performed for all the touch operations), a timer for measuring the time until the next touch operation is started. Alternatively, a configuration may be adopted in which, when touch-up is performed at touch points other than one point out of a plurality of touch locations at which a multi-touch operation was performed, and a single touch state is entered, the timer starts. After that, in the case where touch-down is performed again after a touch-off state, it is determined before step S501 whether or not a predetermined time has elapsed after the timer was started. The predetermined time is a time during which the user is regarded to have been performing a series of continuous touch operations since the previous touch operation, and is approximately 50 to 500 msec, for example. In the case where the predetermined time has elapsed, the procedure advances to step S501, where the touch-move flag is turned off, and the above-described processing of step S502 onward in FIG. 5 is performed subsequently. On the other hand, in the case where the predetermined period has not elapsed, the above-described processing of step S501 is not performed, in other words, the touch-move flag is not turned off, and the above-described processing of step S502 onward in FIG. 5 is performed. With a configuration in which the touch-move flag is not turned off in this manner, touch-move by a single touch is performed in the previous touch operation (first touch operation) before touch-off state is entered, and if the touch-move flag is turned on, the on state is maintained. Therefore, even if a pinch-out operation without touch-move by a single touch is performed in the present touch operation (second touch operation), second enlarging processing that is not based on the touch positions (processing of step S512 or S513) is performed. With such a configuration, in the case where enlargement to a desired magnification could not be achieved by pinch-out at one time, and the next pinch-out operation is immediately performed in order to perform enlargement to a further degree, a reference position for enlargement can be the same as the previous pinch-out. Accordingly, in the case of performing consecutive pinch operations, a reference position for enlargement/reduction does not change, which is favorable. Except for that, the variation is similar to the embodiment above.

Suitable embodiments of the present invention have been described above. The present invention should not be limited to theses embodiments, and various modifications and changes can be made within the scope of the gist of the present invention.

Note that a single item of hardware may control the system control unit 201, or the entire apparatus may be controlled by a plurality of items of hardware sharing processing.

Although the present invention has been elaborated above based on suitable embodiments thereof, the present invention is by no means limited to these specific embodiments and includes various modifications without departing from the concept of the present invention. The above embodiments are merely illustrative embodiments of the present invention, and may be combined where appropriate.

Although the above embodiments have described an example in which the present invention is applied to a digital camera, the present invention is not limited to this example. The present invention is applicable to, for example, an apparatus capable of display control such as enlargement, reduction and movement of an image in accordance with a touch operation on a touch panel. More specifically, the present invention is applicable to a personal computer, a tablet terminal, which is a kind of a personal computer, a mobile telephone terminal, a smart phone (includes eyeglasses type terminal device and wrist watch type terminal devices), which is a kind of a mobile telephone terminal, a PDA (Personal Digital Assistant), a mobile image viewer, a music player, a game console, an electronic book reader, a business equipment comprising functions such as a printer, a scanner, a facsimile, and/or a copy machine, a medical equipment and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-002996, filed Jan. 8, 2016 which is hereby incorporated by reference herein in its entirety.

What is claimed is:

1. A display control apparatus comprising:
a touch detector configured to detect a touch operation on a display unit; and
a memory and at least one processor and/or at least one circuit to perform the operations of the following units:
a display control unit configured to:
perform control, in a case where the touch detector detects a multi-touch operation on the display unit without detecting a predetermined touch operation maintained on the display unit from a time before detection of the multi-touch operation, such that a display object displayed on the display unit is enlarged or reduced in accordance with the multi-touch operation, with reference to a first position that is based on the positions at which the multi-touch operation is performed, the predetermined touch operation including movement of a touch position on the display unit, and
perform control, in a case where the touch detector detects the predetermined touch operation and the touch detector detects a multi-touch operation while at least one touch of the predetermined touch operation has been maintained after the predetermined touch operation was performed, such that the display object displayed on the display unit is enlarged or reduced in accordance with the multi-touch operation, with reference to a second position that is not based on the positions at which the multi-touch operation is performed.

2. The apparatus according to claim 1, wherein
the first position is located at a substantially central position between the touch positions at which the multi-touch operation is performed.

3. The apparatus according to claim 1, wherein
the second position is at a substantially central position of a display range of a display object displayed on the display unit.

4. The apparatus according to claim 3, wherein
the second position is a position that is not based on the central portion of the display range of the display object but based on an edge portion of the display object, in a case where the edge portion of the display object is displayed.

5. The apparatus according to claim 1, wherein
the predetermined touch operation is an operation for moving a touch position by a predetermined amount or more while a touch is maintained on the display object.

6. The apparatus according to claim 1, wherein
the predetermined touch operation is a single touch operation.

7. The apparatus according to claim 1, wherein
the display control unit is configured to change, in accordance with the predetermined touch operation, a display range of the display object in a display area of the display unit.

8. The apparatus according to claim 1, wherein
the display control unit is configured to display a reference position for enlargement or reduction, in accordance with the multi-touch operation being detected.

9. The apparatus according to claim 1, wherein
the display object is an image.

10. The apparatus according to claim 1, wherein
the display object is at least one of a document, a Web page, and a map.

11. The apparatus according to of claim 1, wherein
the display control apparatus is an image capturing apparatus.

12. The apparatus according to claim 1, wherein
the display control apparatus is at least one of a mobile phone terminal, a personal computer and a tablet terminal.

13. The apparatus according to claim 1, wherein
in a case where a state where no location is touched is entered after the predetermined touch operation is performed with a first touch operation, a second touch operation is subsequently performed during a predetermined period after the first touch operation ends, and a multi-touch operation by the second touch operation is detected, the display control unit performs control such that the display object is enlarged or reduced with reference to a second position that is not based on the plurality of touch positions at which the multi-touch operation by the second touch operation is performed, even if the predetermined touch operation has not been detected after the first touch operation ends.

14. A control method of a display control apparatus comprising:
detecting a touch operation on a display unit; and
performing control, in a case where a multi-touch operation on the display unit is detected, and a predetermined touch operation maintained on the display unit from a time before detection of the multi-touch operation is not detected, such that a display object displayed on the display unit is enlarged or reduced in accordance with the multi-touch operation, with reference to a first position that is based on the positions at which the multi-touch operation is performed, the predetermined touch operation including movement of a touch position on the display unit; and
performing control, in a case where the predetermined touch operation is detected, and a multi-touch operation on the display unit is detected while at least one touch of the predetermined touch operation has been maintained after the predetermined touch operation was performed, such that the display object displayed on the display unit is enlarged or reduced in accordance with the multi-touch operation, with reference to a second position that is not based on the positions at which the multi-touch operation is performed.

15. A display control apparatus comprising:
a touch detector configured to detect a touch operation on a display unit; and
a memory and at least one processor and/or at least one circuit to perform the operations of the following units:
a display control unit configured to:
  perform control, in a case where a multi-touch operation on the display unit is detected after a predetermined time has elapsed since a predetermined touch operation was detected, such that a display object displayed on the display unit is enlarged or reduced in accordance with the multi-touch operation, with reference to a first position that is based on the positions at which the multi-touch operation is performed, the predetermined touch operation including movement of a touch position on the display unit, and
  perform control, in a case where a multi-touch operation on the display unit is detected within the predetermined period after the predetermined touch operation was detected, such that the display object displayed on the display unit is enlarged or reduced in accordance with the multi-touch operation with reference to a second position that is not based on the positions at which the multi-touch operation is performed.

16. The apparatus according to claim 15, wherein
the first position is located at a substantially central position between the positions at which the multi-touch operation is performed,
the second position is at a substantially central position of a display range of the display object displayed on the display unit,
the predetermined touch operation is a touch operation, at one location, for moving a touch position by a predetermined amount or more while a touch is maintained on the display object, and
the display control unit is configured to change the display range of the display object in a display at area of the display unit, in accordance with the predetermined touch operation.

17. A control method of a display control apparatus comprising:
detecting a touch operation on a display unit;
performing control, in a case where a multi-touch operation on the display unit is detected after a predetermined time has elapsed since a predetermined touch operation was detected, such that a display object displayed on the display unit is enlarged or reduced in accordance with the multi-touch operation, with reference to a first position that is based on the positions at which the multi-touch operation is performed, the predetermined touch operation including movement of a touch position on the display unit, and
performing control, in a case where a multi-touch operation on the display unit is detected within the predetermined period after the predetermined touch operation was detected, such that the display object displayed on the display unit is enlarged or reduced in accordance with the multi-touch operation, with reference to a second position that is not based on the positions at which the multi-touch operation is performed.

18. A non-transitory computer-readable storage medium storing a program for causing a computer to function as a display control unit of a display control apparatus having a touch detector configured to detect a touch operation on a display unit, wherein the display control unit is configured to:
perform control, in a case where the touch detector detects a multi-touch operation on the display unit without detecting a predetermined touch operation maintained on the display unit from a time before detection of the multi-touch operation, such that a display object displayed on the display unit is enlarged or reduced in accordance with the multi-touch operation, with reference to a first position that is based on the positions at which the multi-touch operation is performed, the predetermined touch operation including movement of a touch position on the display unit, and
perform control, in a case where the touch detector detects the predetermined touch operation and the touch detector detects a multi-touch operation while at least one touch of the predetermined touch operation has been maintained after the predetermined touch operation was performed, such that the display object displayed on the display unit is enlarged or reduced in accordance with the multi-touch operation, with reference to a second position that is not based on the positions at which the multi-touch operation is performed.

19. A non-transitory computer-readable storage medium storing a program for causing a computer to function as a display control unit of a display control apparatus having a touch detector configured to detect a touch operation on a display unit, wherein
the display control unit is configured to:
perform control, in a case where a multi-touch operation on the display unit is detected after a predetermined time has elapsed since a predetermined touch operation was detected, such that a display object displayed on the display unit is enlarged or reduced in accordance with the multi-touch operation, with reference to a first position that is based on the positions at which the multi-touch operation is performed, the predetermined touch operation including movement of a touch position on the display unit, and
perform control, in a case where a multi-touch operation on the display unit is detected within the predetermined period after the predetermined touch operation was detected, such that the display object displayed on the display unit is enlarged or reduced in accordance with the multi-touch operation with reference to a second position that is not based on the positions at which the multi-touch operation is performed.

* * * * *